(12) United States Patent
Mason

(10) Patent No.: US 8,839,994 B2
(45) Date of Patent: Sep. 23, 2014

(54) AEROSOL CAN SPRAY NOZZLE EXTENSION TUBE ADAPTER

(76) Inventor: Tyler S. Mason, Burbank, CA (US)

( * ) Notice: Subject to any disclaimer, the term of this patent is extended or adjusted under 35 U.S.C. 154(b) by 398 days.

(21) Appl. No.: 13/360,088

(22) Filed: Jan. 27, 2012

(65) Prior Publication Data

US 2013/0193240 A1    Aug. 1, 2013

(51) Int. Cl.
*B05B 9/03* (2006.01)
*B05B 7/32* (2006.01)

(52) U.S. Cl.
USPC ............... 222/402.13; 239/302; 222/402.1

(58) Field of Classification Search
CPC .......... B65D 83/00; B65D 1/32; A62C 13/62; A62C 13/66; A62C 35/58; B05B 9/03; B05B 7/32; F23D 11/24; F23D 14/28; F23D 14/34; F23D 11/06; A01G 25/14
USPC ......... 239/302, 327, 337, 338, 375, 223, 381, 239/424, 424.5, 102.1, 589.1; 222/402.1, 222/402.13

See application file for complete search history.

(56) References Cited

U.S. PATENT DOCUMENTS

| | | | |
|---|---|---|---|
| 2,968,441 A | 1/1961 | Holcomb | |
| 3,186,645 A | 6/1965 | Eberlein | |
| 3,216,628 A | 11/1965 | Ferguson | |
| 3,221,950 A | 12/1965 | O'Donnell | |
| 3,472,457 A | 10/1969 | McAvoy | |
| 3,993,224 A | 11/1976 | Harrison | |
| 4,013,231 A | 3/1977 | Van Veldhoven | |
| 4,305,528 A | 12/1981 | Craig | |
| 4,664,300 A | 5/1987 | Strickland | |
| 4,991,750 A * | 2/1991 | Moral | 222/402.24 |
| 5,058,783 A | 10/1991 | Antonelli | |
| 5,297,704 A | 3/1994 | Stollmeyer | |
| 5,307,964 A | 5/1994 | Toth | |
| 5,529,226 A * | 6/1996 | Alberth, Jr. | 222/402.1 |
| 5,873,497 A | 2/1999 | Broadus | |
| 5,887,767 A | 3/1999 | Riley et al. | |
| 5,988,575 A | 11/1999 | Lesko | |
| 6,102,258 A | 8/2000 | Riley et al. | |
| 6,253,971 B1 * | 7/2001 | Cobb | 222/402.1 |
| 6,412,657 B2 | 7/2002 | Riley et al. | |
| 6,783,037 B1 * | 8/2004 | Bonham | 222/570 |
| 7,044,338 B2 * | 5/2006 | Roden | 222/153.11 |
| 7,077,295 B2 | 7/2006 | Walker | |
| 7,600,701 B2 | 10/2009 | Jasper et al. | |
| 2006/0011665 A1 * | 1/2006 | Garner | 222/402.1 |
| 2007/0181610 A1 * | 8/2007 | Fazekas et al. | 222/402.11 |
| 2008/0135649 A1 * | 6/2008 | Smyth | 239/588 |
| 2010/0288797 A1 * | 11/2010 | Sogaro | 222/402.1 |

* cited by examiner

*Primary Examiner* — Justin Jonaitis
(74) *Attorney, Agent, or Firm* — Stetina Brunda Garred & Brucker

(57) ABSTRACT

Provided is an adapter configured for use with an aerosol can spray nozzle and an extension tube. The adapter is configured to fit onto the spray nozzle and to receive the extension tube to provide a more rigid and fluidly secure connection between the spray nozzle and the extension tube. The adapter includes a spray nozzle portion and an extension tube portion. The spray nozzle portion includes an opening sized and configured to allow the spray nozzle to be insertable therein to create frictional engagement therebetween. The extension tube portion includes an inner channel extending therethrough, and is sized and configured to allow the extension tube to be insertable therein to create friction-tight engagement between the extension tube and the adapter.

20 Claims, 13 Drawing Sheets

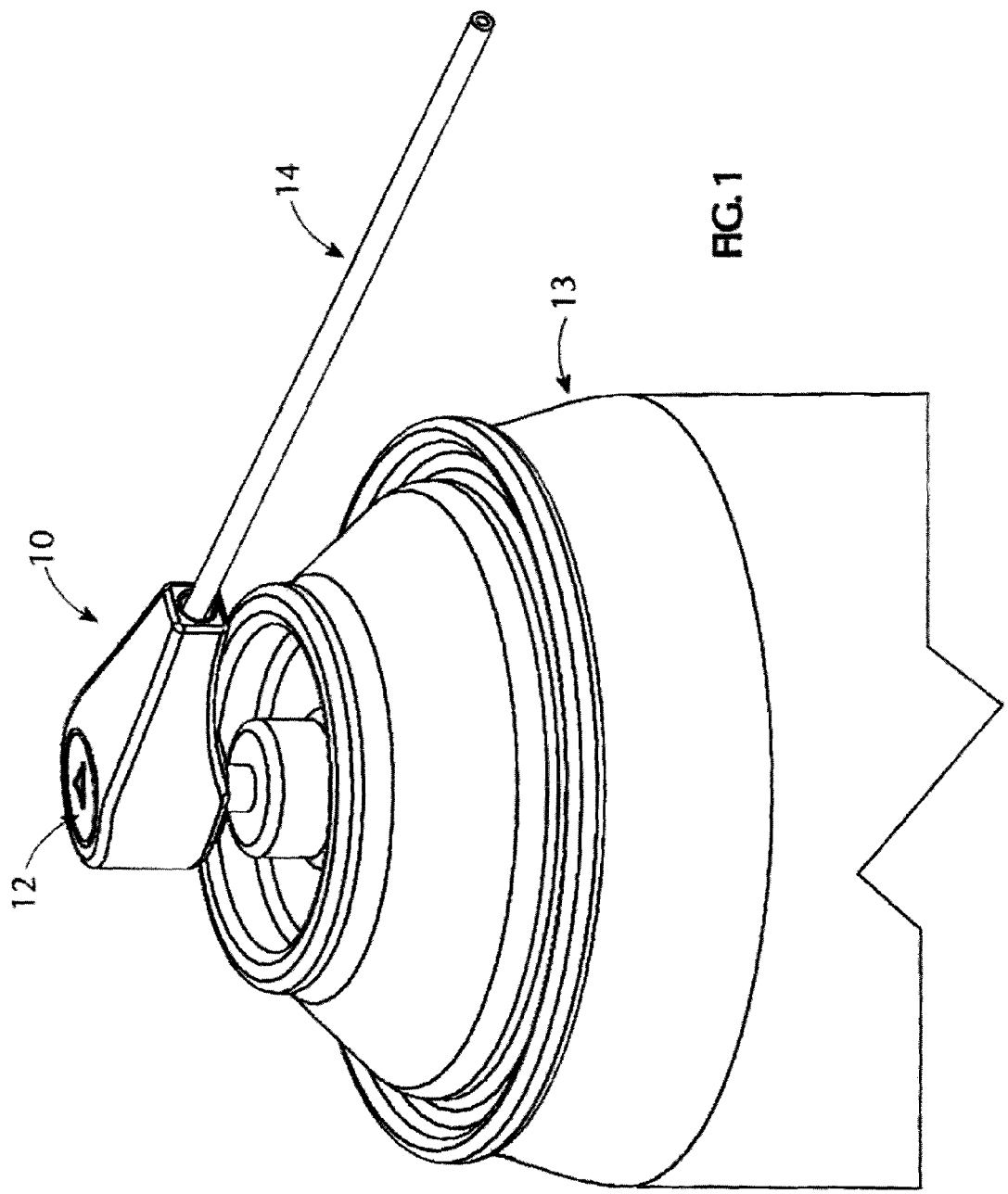

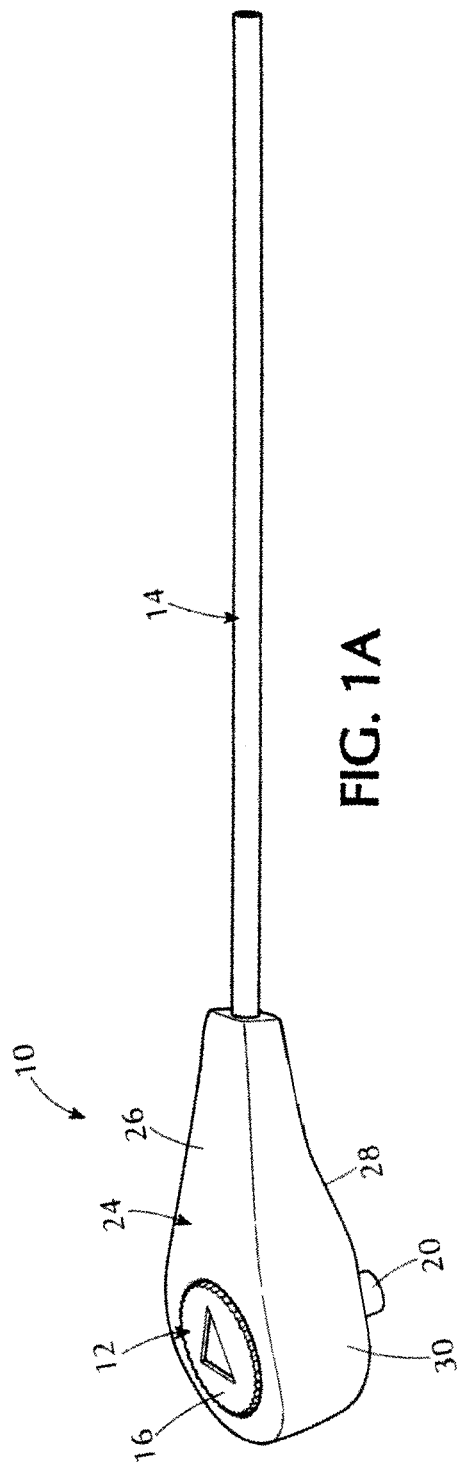

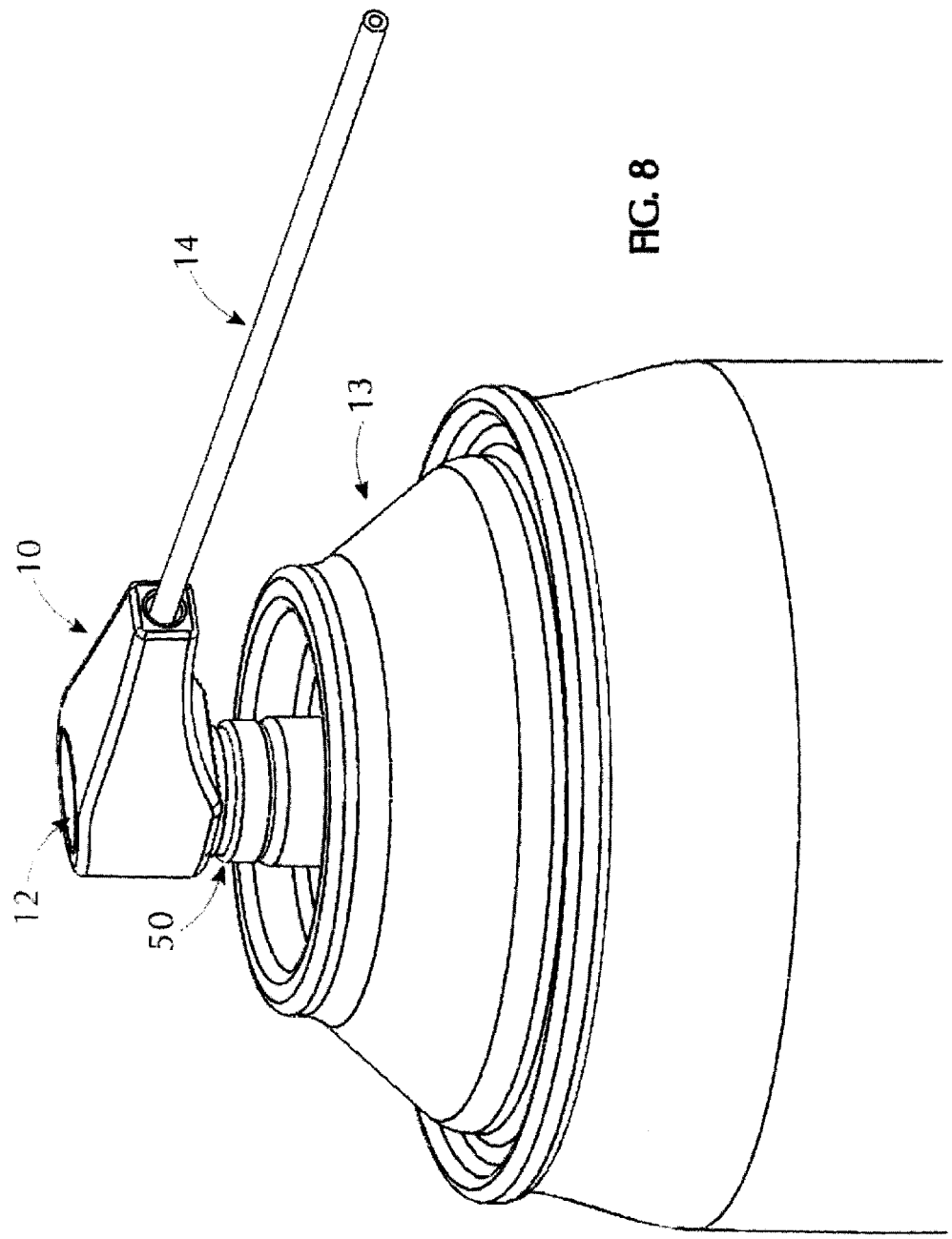

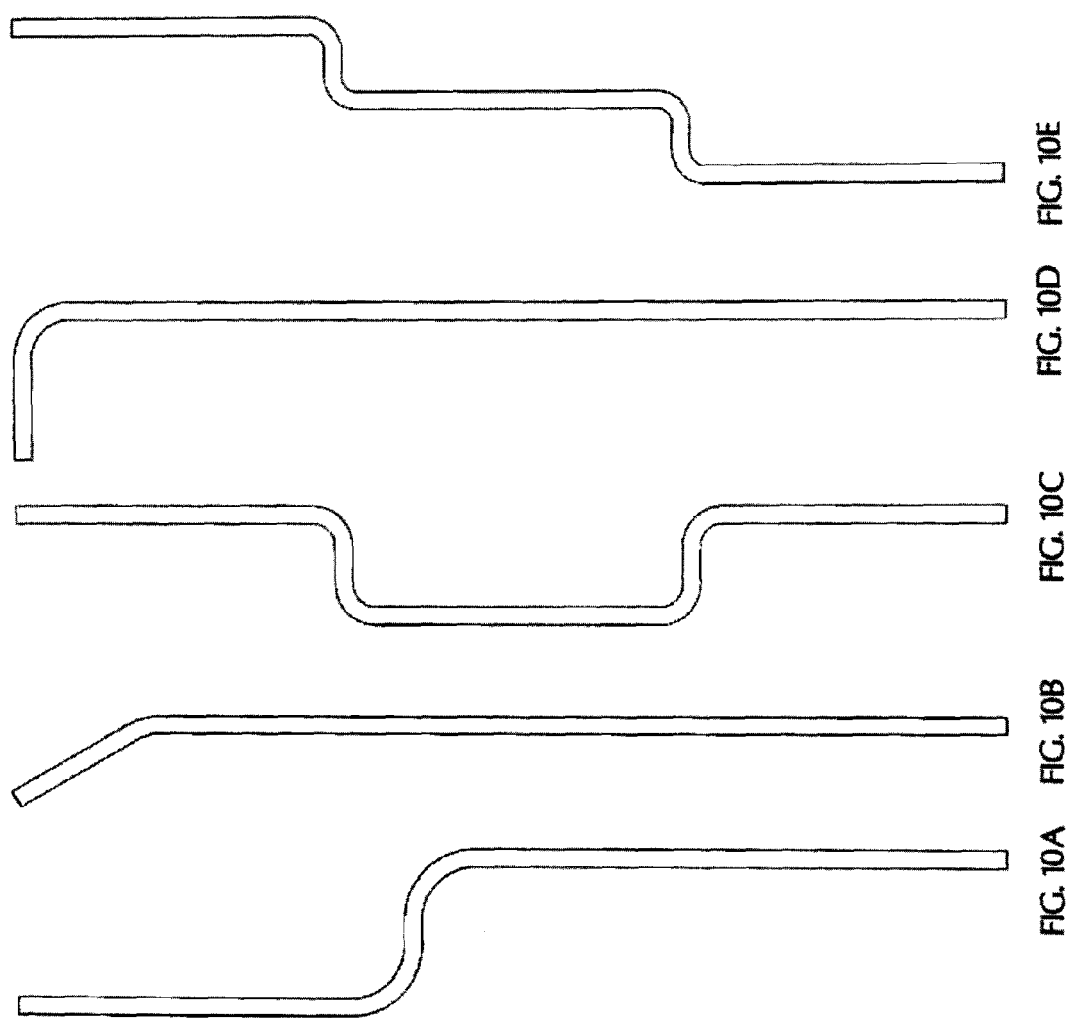

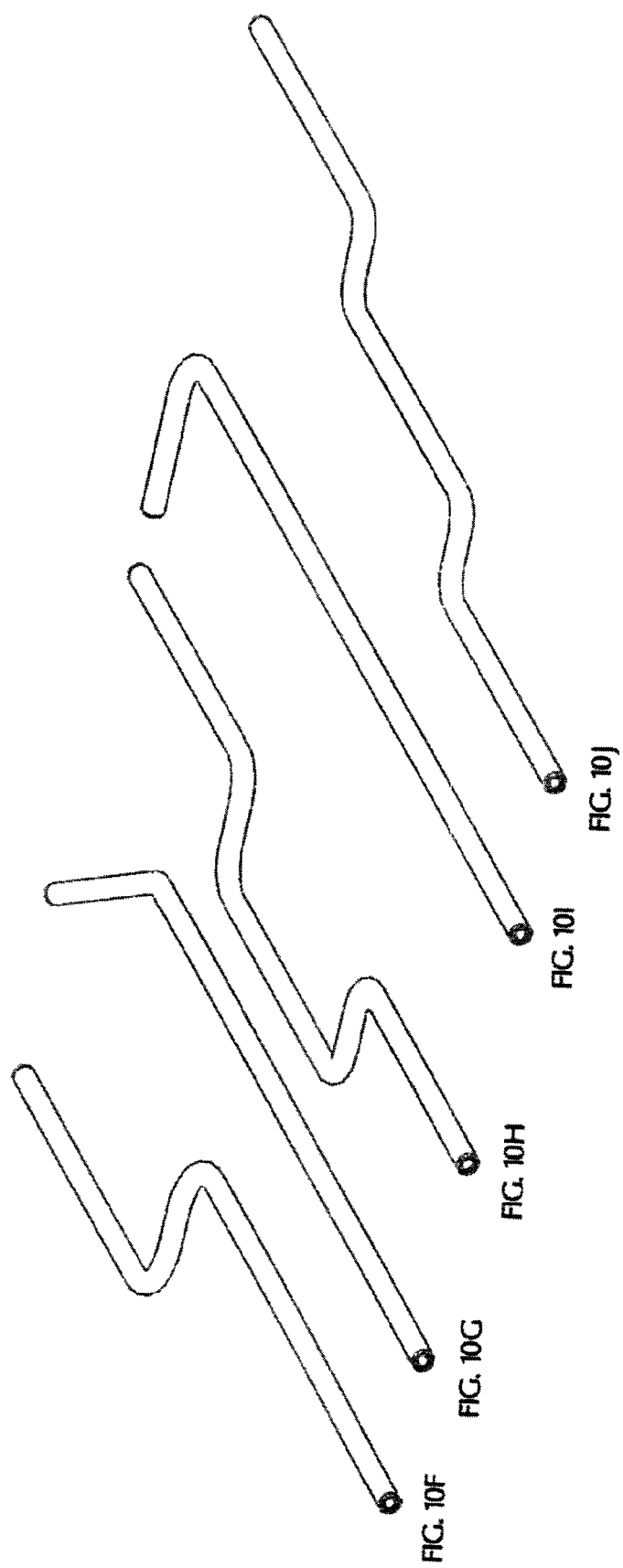

AEROSOL CAN SPRAY NOZZLE EXTENSION TUBE ADAPTER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to an adapter for an aerosol can, and more specifically, to an adapter configured to fit onto a spray nozzle of the aerosol can to enhance the engagement between the spray nozzle and an extension tube.

2. Description of the Related Art

Aerosol cans are well-known in the art and are extensively used to deliver a wide variety of products, including lubricants, paints, personal care products, food products, insulation and caulks, herbicides and insecticides, as well as compressed air for cleaning. In recent years, annual production of aerosol cans in the United States alone has surpassed 10 billion cans.

Aerosol cans generally include a can body defining an internal reservoir or chamber which stores a pressurized gas/liquid mixture to be dispensed through a spray nozzle connected to the can's dispensing mechanism, i.e., valve stem, orifice, etc. Aerosol cans are typically operated by depressing the spray nozzle to actuate dispensing of the contents stored within the internal reservoir. The spray nozzle may be specifically designed to control the spray pattern and droplet size of the fluid emitted from the aerosol can.

Some aerosolized products require precise control onto remote, hard to reach areas. Current methods of dispensing such products may employ a spray nozzle having an orifice sized to allow for insertion of an extension tube so that the point of disbursement is on the order of a few inches to several inches away from the spray nozzle (depending on the size of the extension tube).

Typically, the extension tubes are seated within a recess formed about the fluid dispensing orifice in the spray nozzle to connect the extension tubes to the spray nozzle and to facilitate fluid communication therebetween. Thus, as the spray nozzle emits the product, the product travels through the extension tube and is emitted out an end portion thereof.

A common deficiency associated with aerosol cans relates to the connection between the spray nozzle and the extension tubes. More specifically, the extension tube may easily become disconnected from the spray nozzle, such as from the user bumping the tube against a surface or object. Furthermore, the force of the can's pressurized air/gas, along with the liquid contained therein may lubricate the recess on the spray nozzle, thereby allowing the extension tube to lose its grip and become dislodged from the nozzle. As such, the user may continue to spray the contents of the aerosol can with much less efficiency to the intended area. The user may attempt to remedy the situation by using one hand to hold the extension tube in fluid engagement with the spray nozzle, and use their other hand to actuate the spray nozzle, which may be difficult, especially if the aerosol can is being used in small, confined spaces.

Accordingly there is a need in the art for a device which can improve the connection between the aerosol can and the extension tube to mitigate unwanted disconnection between the aerosol can spray nozzle and the extension tube.

The present invention addresses this particular need, as will be discussed in more detail below.

BRIEF SUMMARY OF THE INVENTION

According to an aspect of the present invention, there is provided a removable adapter configured for use with an aerosol can spray nozzle and an extension tube. The adapter is configured to fit onto the spray nozzle and to receive the extension tube to provide a more rigid and fluidly secure connection between the spray nozzle and the extension tube.

According to one embodiment, the adapter includes an adapter body having a first surface, a second surface, and a side surface extending between the first and second surfaces. The adapter body defines a spray nozzle portion and an extension tube portion. The spray nozzle portion includes an opening extending from the first surface to the second surface, with the opening being sized and configured to allow the spray nozzle to be insertable therein, and is configured with tolerances as to allow the adapter to squeeze/grip the nozzle with friction tight engagement to mitigate inadvertent dislodging of the adapter from the spray nozzle. The extension tube portion includes an inner channel extending from the opening to the peripheral sidewall. The inner channel is sized and configured to allow the extension tube to be insertable therein, and is configured to define a tolerance which creates a friction-tight engagement between the extension tube and the adapter body. The inner channel is also designed to be alignable with the nozzle orifice when the spray nozzle is inserted within the opening.

The adapter body may be formed from a resilient material, such as rubber, plastic or the like to allow the adapter body to expand around the spray nozzle and to tightly fit on the spray nozzle. The resilient nature of the adapter body may allow the size of the adapter body opening to increase when the spray nozzle is inserted into the opening. It is also contemplated that the adapter may be formed from a metallic or composite materials, such as aluminum or carbon fiber.

The inner channel of the adapter body may be configured to allow the extension tube to be inserted therein by a first force and to allow the extension tube to be removed by a second force equal to or greater than the first force. Along these lines, the adapter body may include a plurality of projections extending into the inner channel to facilitate the friction-tight engagement between the adapter body and the extension tube. The adapter body may additionally include a plurality of annular protrusions extending into the inner channel to facilitate the friction-tight engagement between the adapter body and the extension tube. The adapter body may further include a helical protrusion extending into the inner channel to facilitate friction-tight engagement between the adapter body and the extension tube.

The adapter body may include a open slot formed within the spray nozzle portion and extending in a first direction from the opening to the side surface and in a second direction from the first surface to the second surface. The open slot may be configured to allow the size of the opening to increase when the nozzle is inserted into the opening.

The present invention is best understood by reference to the following detailed description when read in conjunction with the accompanying drawings.

BRIEF DESCRIPTION OF THE DRAWINGS

The features and advantages of the various embodiments disclosed herein will be better understood with respect to the following description and drawings in which like numbers refer to like parts throughout and in which:

FIG. 1 is an upper perspective view of an adapter for securely and fluidly connecting an extension tube to a spray nozzle of an aerosol can;

FIG. 1A is an upper perspective view of the adapter, extension tube and spray nozzle of FIG. 1;

FIG. 8 is an upper perspective view of a dampener used in connection with the adapter on an aerosol can spray nozzle;

FIGS. 10A-10J are top views of various embodiments of extension tubes configured for use with the adapter.

Common reference numerals are used throughout the drawings and detailed description to indicate like elements.

DETAILED DESCRIPTION OF THE INVENTION

The detailed description that follows is intended to describe the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by a variety of different embodiments and that they are also intended to be encompassed within the scope of the invention.

Referring now to FIG. 1, there is shown an adapter 10 for securely connecting an extension tube 14 to a spray nozzle 12 of an aerosol can 13. The adapter 10 is configured to be easily connected to the spray nozzle 12 and the extension tube 14, and to allow the extension tube 14 to engage with the spray nozzle 12 to fluidly connect the extension tube 14 to the spray nozzle 12. The adapter 10 is configured to frictionally engage the extension tube 14 to maintain the engagement and fluid connection between the extension tube 14 and the spray nozzle 12 during usage. In this regard, the adapter 10 prevents leakage between the spray nozzle 12 and the extension tube 14. The adapter 10 is also configured to allow for disassembly of the extension tube 14 from the spray nozzle 12 during nonuse of the spray can.

As used herein, a spray nozzle 12 may include any fluid dispense mechanism connected to a fluid housing having an internal fluid reservoir, such as an aerosol can or spray bottle. The fluid reservoir may have a straw or tube extending into the fluid to communicate fluid from the fluid reservoir to the spray nozzle 12. Fluid may be emitted from the spray nozzle 12 by pressing or pumping the spray nozzle 12 relative to the fluid housing. The internal pressure within the fluid housing may force the fluid out of the fluid housing when the spray nozzle 12 is actuated. The pressing or pumping motion of the spray nozzle 12 relative to the fluid housing may also "pump" the fluid out of the fluid housing through the spray nozzle 12.

Figure 2:
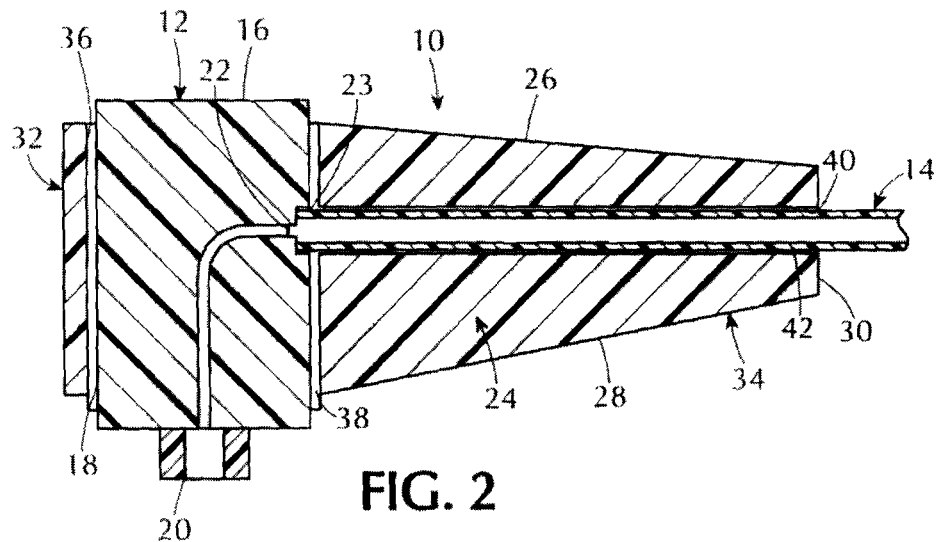
FIG. 2 is a cross sectional view of the adapter, nozzle and extension tube.

The exemplary spray nozzle 12 shown in the drawings includes an upper surface 16 (see FIG. 2) and a sidewall 18 (see FIG. 2). A stem 20 extends from the spray nozzle 12 to engage with the valve mechanism in the can 13. The spray nozzle 12 may include an opening 22 extending through the side wall 18 for emitting the fluid therefrom. The opening 22 may be formed within a recess 23 sized to receive a portion of the extension tube 14 to fluidly connect the spray nozzle 12 to the extension tube 14.

The adapter 10 is designed to engage with the spray nozzle 12 and the extension tube 14 to mitigate unwanted disconnection therebetween. Referring now specifically to FIGS. 1A and 2, the adapter 10 includes an adapter body 24 having an upper surface 26 extending generally across the top of the adapter body 24, a lower surface 28 extending generally along the bottom of the adapter body 24, and a side surface 30 extending between the upper and lower surfaces 26, 28 along the periphery of the adapter body 24. Those skilled in the art will appreciate that the surfaces 26, 28, 30 are not limited to planar surfaces, and that the surfaces 26, 28, 30 may be angled, slanted, curved, arcuate, etc. without departing from the spirit and scope of the present invention.

The adapter body 24 further defines a spray nozzle portion 32 configured to engage with the spray nozzle 12 and an extension tube portion 34 configured to engage with the extension tube 14. The spray nozzle portion 32 includes a first inner wall or engagement wall 36 extending between the upper surface 26 and the lower surface 28 to define an opening 38 configured to receive the spray nozzle 12. The first inner wall 36 is sized and configured to frictionally engage the spray nozzle 12 to connect the adapter body 24 thereto. In this regard, the size and shape of the first inner wall 36 and the corresponding opening 38 may be complimentary in shape to the size and configuration of the spray nozzle 12. The first inner wall 36 may be configured to circumferentially squeeze or grip the spray nozzle 12 to maintain the connection between the spray nozzle 12 and the adapter 10.

The extension tube portion 34 is connected to the spray nozzle portion 32 and includes a second inner wall 40 extending from the first inner wall 36 to the side wall 30 to define an inner channel 42. The inner channel 42 is sized and configured to allow the extension tube 14 to be insertable therein to engage with the spray nozzle 12, as shown in FIG. 2. In this regard, the adapter 10 is engaged with the spray nozzle 12 such that the opening 22 in the spray nozzle 12 is aligned with the inner channel 42 of the adapter 10. Thus, when an end portion of the extension tube 14 is inserted within the inner channel 42, the end of the extension tube 14 may seat within the recess 23 formed within the spray nozzle 12 to fluidly connect the extension tube 14 to the spray nozzle 12. Therefore, when the extension tube 14 is connected to the spray nozzle 12, and when the spray nozzle 12 is actuated, fluid may be communicated from the spray nozzle 12 to the extension tube 14.

The inner channel 42 is sized and configured to mitigate inadvertent removal of the extension tube 14 therefrom. According to one embodiment, the inner channel 42 frictionally engages the extension tube 14 to maintain the extension tube 14 in fluid connection with the spray nozzle 12. In this regard, in order to remove the extension tube 14 from the spray nozzle 12 and adapter 10, a force must be applied to the extension tube 14 to overcome the frictional engagement between the extension tube 14 and the adapter 10.

The adapter body 24 may have certain attributes designed to enhance the engagement between the adapter body 24 and the spray nozzle 12, and between the adapter body 24 and the extension tube 14. For instance, in one embodiment, the adapter body 24 may be formed from a resilient material, such as rubber, plastic, foam or the like, which may expand to increase the size of the opening 38 to allow the adapter body 24 to be disposed around the spray nozzle 12. The opening 38 may then decrease in size, i.e., contract, around the spray nozzle 12 to tightly engage the spray nozzle 12. In this regard, the opening 38 may be sized to define a diameter or other peripheral dimension that is slightly smaller than the corresponding dimension of the spray nozzle 12, such that the opening 38 is stretched around the spray nozzle 12 as it is inserted within the opening 38.

Likewise, the size of the inner channel 42 may expand during insertion of the extension tube 14 and subsequently contract around the extension tube 14 to tightly engage the extension tube 14. Thus, the diameter or other peripheral dimension of the inner channel 42 may be smaller than the corresponding dimension of the extension tube 14 (i.e., the outer diameter), such that insertion of the extension tube 14 causes the inner channel 42 to expand and impart a frictional force on the extension tube 14.

Figure 3A:
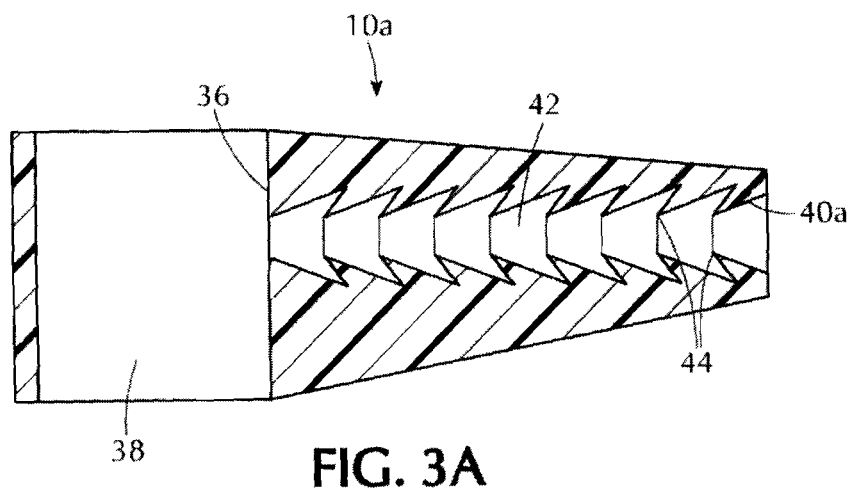
FIG. 3A is a cross sectional view of another embodiment of the adapter including uni-directional teeth formed within an inner channel.

FIGS. 3A-3D show several side sectional views of various embodiments of the adapter body wherein the inner channel is configured to maintain engagement between the adapter body and the extension tube. Referring now specifically to FIG. 3A, there is shown an embodiment of the adapter 10a wherein the second inner wall 40a defines a plurality of uni-directional teeth 44 extending at an angle into the inner channel 42 toward the first inner wall 36. The uni-directional teeth 44 make it easier to insert the extension tube 14 into the inner channel 42 and more difficult to remove the extension tube 14 from the inner channel 42. Thus, a first force may be used to insert the extension tube 14 into the inner channel 42 and a second force may be required to remove the extension tube 14 from the inner channel 42, wherein the second force is larger than the first force.

Figure 3B:
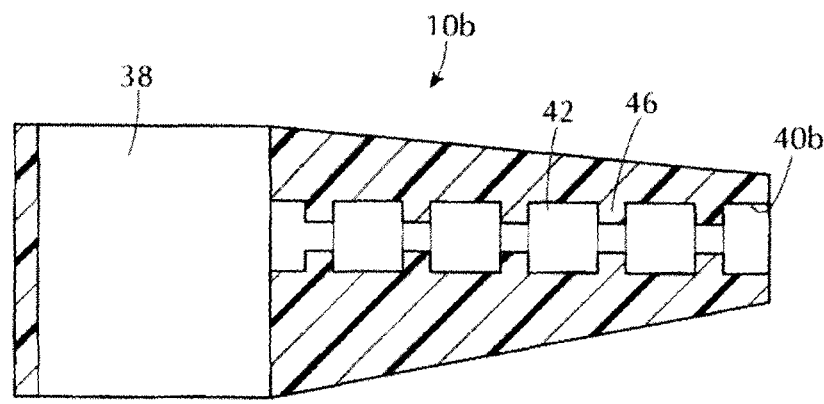
FIG. 3B is a cross sectional view of another embodiment of the adapter including a plurality of annular protrusions formed within an inner channel.

Referring now specifically to FIG. 3B, there is shown another embodiment of the adapter 10b wherein the inner channel 42 is configured to maintain the extension tube 14 in fluid engagement with the spray nozzle 12. In the embodiment shown in FIG. 3B, the second inner surface 40b forms a plurality of concentric annular rings 46 which extend into the inner channel 42. The rings 46 are configured to allow the extension tube 14 to be inserted therein and to exert a frictional force on the extension tube 14 to make it difficult to remove the extension tube 14. In this regard, the rings 46 define an opening having an inner diameter that is sized to receive the extension tube 14 in friction tight engagement.

Figure 3C:
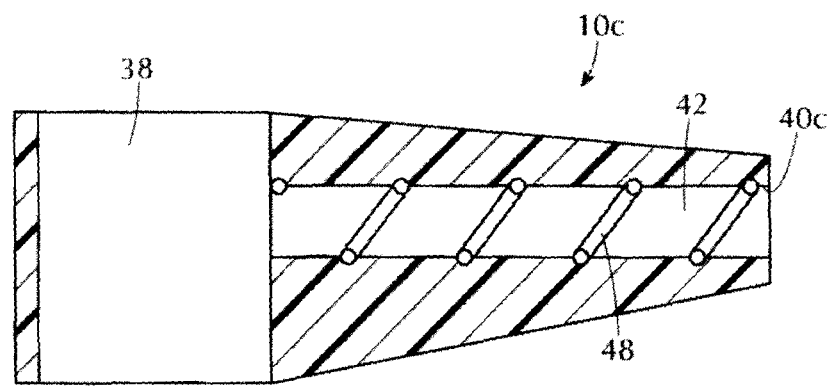
FIG. 3C is a cross sectional view of a further embodiment of the adapter including a helical projection formed within an inner channel.

Referring now specifically to FIG. 3C, there is shown a different embodiment of the adapter 10c, wherein the second inner surface 40c forms a helical protrusion 48 extending into the inner channel 42. The helical protrusion 48 provides a frictional force similar to the annular rings 46 or teeth 44 discussed above to "grip" the extension tube 14 when the extension tube 14 is inserted within the inner channel 42. The helical protrusion 48 defines an opening which is sized to allow the extension tube 14 to be inserted therein and to allow the helical protrusion 48 to frictionally engage the extension tube 14.

Figure 3D:
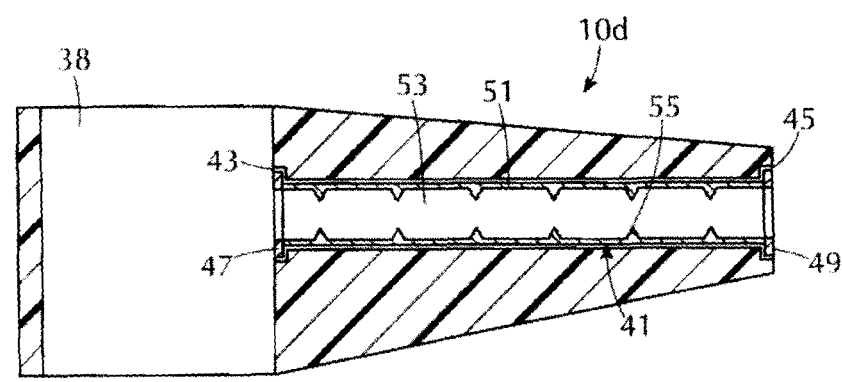
FIG. 3D is a cross sectional view of still another embodiment of the adapter including a gripping insert disposed within the inner channel.

FIG. 3D shows still another embodiment of an adapter 10d having a gripping insert 41 positioned within the inner channel 42 to enhance the gripping capability of the adapter 10d. The adapter 10d is designed to allow the gripping insert 41 to assume a nested configuration within the adapter 10d. Along these lines, the inner channel 42 of the adapter 10d defines a first recess 43 disposed at one end of the inner channel 42 and a second recess 45 disposed at the opposite end of the inner channel 42. The gripping insert 41 includes a first flange 47 which fits within the first recess 43 and a second flange 49 that fits within the second recess 45 and a tubular body 51 that extends between the first and second flanges 47, 49 and defines a gripping member channel 53. The adapter 10d is preferably formed from a resilient material which is deformable to allow the gripping insert 41 to be placed therein, yet assumes the depicted configuration when the gripping insert 41 is completely inserted within the adapter 10d. When the gripping insert 41 is placed within the adapter 10d, the gripping member channel 53 is preferably coaxially aligned with the inner channel 42 of the adapter 10d, such that when an extension tube 14 is inserted into the adapter 10d, the extension tube 14 passes through the gripping member channel 53. The gripping insert 51 additionally includes a plurality of gripping members 55 extending into the gripping member channel 53 to "grip" or engage with the extension tube 14 when the extension tube 14 is inserted therein. In the exemplary embodiment, the gripping members 55 include teeth which extend into the gripping member channel 53, although it is understood that the gripping member(s) 55 may define other shapes or configurations, such as a helical protrusion, annular protrusions, a reduced diameter, a grippable material, threads or other gripping elements known by those skilled in the art.

Figure 4A:
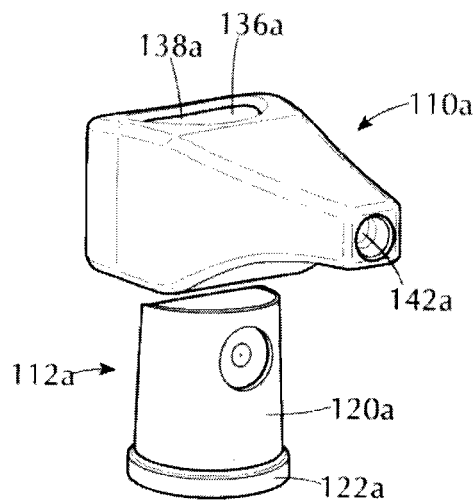
FIGS. 4A-4C are upper perspective views of different embodiments of the adapter used in connection with respective nozzles.
Figure 4B:
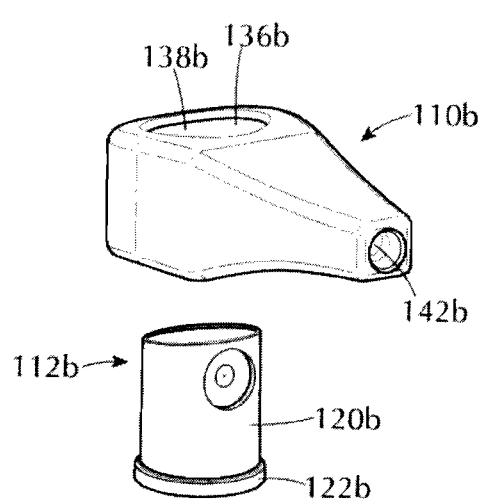
Figure 4C:
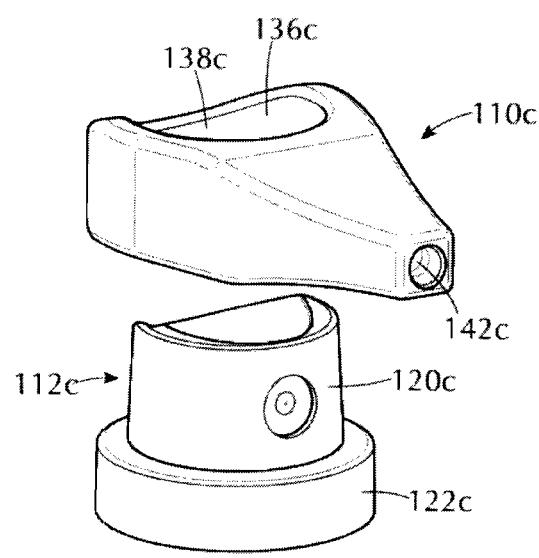

Turning now to FIGS. 4A-4C there is shown several different embodiments of the adapter configured for use with various spray nozzles. Each view is an upper perspective exploded view of the adapter disengaged with a particular embodiment of a spray nozzle. The opening of each adapter is aligned with the spray nozzle such that the adapter may be lowered onto the spray nozzle to effectuate engagement therebetween.

The spray nozzles depicted in FIGS. 4A-4C represent various embodiments of spray nozzle configurations commonly used in the art, although it is understood that the showings in FIGS. 4A-4C do not represent an exhaustive depiction of all possible spray nozzle configurations. Along these lines, the spray nozzles 110a, 110c, in FIGS. 4A, 4B, and 4C include a head portion 120a, 120c, defining a generally semi-circular cross sectional configuration, whereas the spray nozzle 110b in FIG. 4B includes a head portion 120b defining a generally circular configuration. Furthermore, the side surface of the various head portions may define a tapered configuration, wherein the diameter increase from the top to the bottom, or alternatively a generally non-tapered configuration. Another variation between the various spray nozzles 112a-c is the size of the lower rim 122a-c. In this regard, the thickness and width of the lower rim 122a-c varies among the plurality of spray nozzles 112a-c.

The adapters 110a-c shown in FIGS. 4A-4C are specifically configured to be complimentary in shape to a particular spray nozzle 112a-c. Along these lines, each adapter 110a-c includes a first inner wall which defines a opening that is complimentary in shape to the outer contour of the corresponding spray nozzle 112a-c. Furthermore, each adapter includes a second inner wall defining an inner channel which is aligned with a fluid dispense aperture formed within the spray nozzle 112a-c when the adapter is placed on the spray nozzle 112a-c. In this regard, an extension tube 14 may be inserted within the inner channel to fluidly connect the extension tube to the spray nozzle 112a-c. The adapter may be completely engaged or seated on the spray nozzle 112a-c when the adapter 110a-c rests against the lower rim 122a-c of the spray nozzle 112a-c.

In the embodiments of the adapter 110a, 110b, 110c depicted in FIGS. 4A-4C, the first inner wall 136a, 136b, 136c extends completely between the first upper surface and the second lower surface of the adapter body. Thus, the opening 138a, 138b, 138c formed by the first inner wall 136a, 136b, 136c also extends completely through the adapter body.

Figure 5:
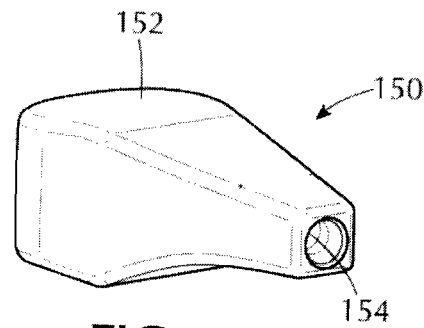
FIG. 5 is an upper perspective view of an embodiment of the adapter having an upper surface which covers the top of the nozzle when the adapter is placed over the nozzle.

Conversely, the adapter 150 shown in FIG. 5 differs from the adapters 110a, 110b, 110c because it includes an upper surface 152 that extends over the spray nozzle 12 when the adapter 150 is placed on the spray nozzle 12. In this regard, the adapter 150 includes an opening sized to receive the spray nozzle 12, wherein the opening does not extend completely through the adapter 150. The upper surface 152 may facilitate alignment of the inner channel 154 with the recessed orifice formed on the spray nozzle 12 such that when the extension tube 14 is advanced through the inner channel 154, the extension tube 14 seats within the recessed orifice 23 formed within the spray nozzle 12.

Figure 6:
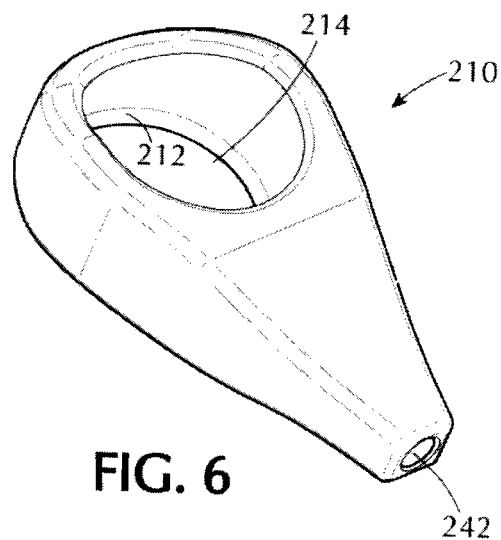
FIG. 6 is an upper perspective view of an embodiment of the adapter having a nozzle receiving opening and a lip extending into the nozzle receiving opening of the adapter.

Referring now specifically to FIG. 6, there is shown another embodiment of an adapter 210 having a lip 212 extending into the opening 214. The lip 212 assists a user in seating the spray nozzle within the opening 214 to facilitate vertical alignment of the opening in the spray nozzle within the inner channel. In the embodiment shown in FIG. 5, the lip 212 is formed on the lower end portion of the adapter body, and extends radially inward into the opening 214. It is contemplated that the spray nozzle is detachable from the aerosol can to insert the spray nozzle into the opening 214 to effectuate engagement therebetween.

Figure 7:
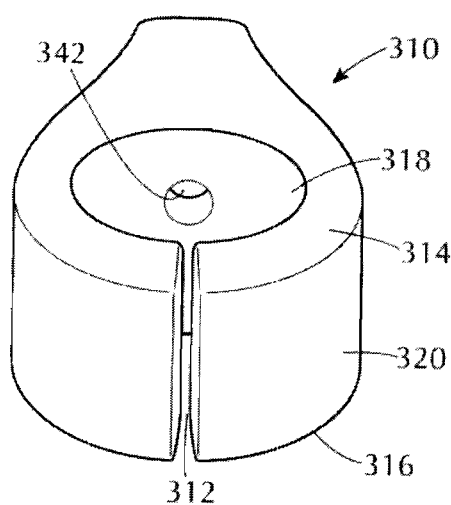
FIG. 7 is an upper perspective view of an embodiment of the adapter having an open slot formed therein to allow the adapter to adjust in size.

Referring now to FIG. 7, there is shown a further embodiment of the adapter 310 having a open slot 312 formed therein, wherein the open slot 312 is configured to allow the adapter body to expand and contract to adjust the size of the adapter body to conform to the size of the spray nozzle when placed on nozzles of different sizes. The open slot 312 extends in a first direction from the first upper surface 314 to the second lower surface 316, and in a second direction from the first inner wall 318 to the exterior sidewall 320 of the adapter body.

Figure 8A:
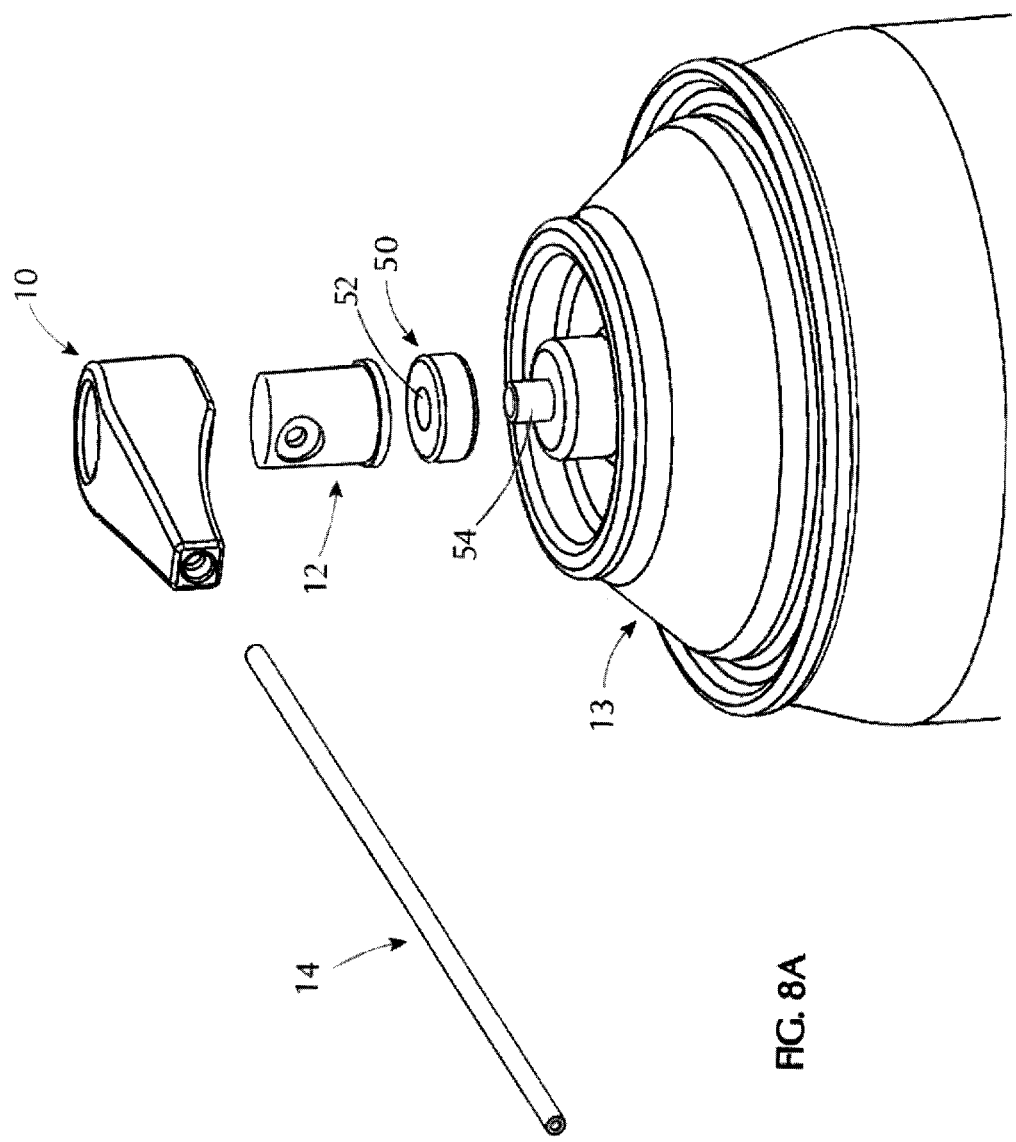
FIG. 8A is an exploded upper perspective view of the assembly shown in FIG. 8.

Referring now to FIGS. 8 and 8A, there is shown a dampener 50 which may be used in connection with the adapter 10 on an aerosol can 13 for controlling the amount of product dispensed by the can 13 by controlling the amount which the spray nozzle 12 is depressed by the user. The dampener 50 defines an annular configuration having an inner opening 52 (see FIG. 8A), which allows the dampener 50 to fit over the stem 54 (see FIG. 8A) of the aerosol can 13 (i.e., the stem 54 is inserted into the inner opening 52). The spray nozzle 12 is then placed on top of the dampener 50, and the adapter 10 over the spray nozzle 12. The upper surface of the dampener 50 is sized and configured to be complimentary in shape to the inner profile or lower surface of the spray nozzle 12, such that when the spray nozzle 12 is placed on top of the dampener 50, there is a complimentary engagement between the spray nozzle 12 and the dampener 50. Along these lines, those skilled in the art will readily appreciate that there are several different configurations of spray nozzles 12 which the dampener 50 may be configured for use with.

In use, the dampener 50 increases the resistance as the user presses on the spray nozzle 12 to actuate the aerosol can's valve mechanism. The dampener is formed from a resilient material which compresses as the user depresses on the spray nozzle 12, which in turn, presses on the dampener 50. When the user releases the pressure on the spray nozzle 12, the dampener 50 assumes its original configuration. In this regard, the dampener is flexible from a completely flexed configuration when the user has completely depressed the spray nozzle 12, and an unflexed configuration, when the user releases the spray nozzle 12. The dampener 50 is biased toward the unflexed configuration, which urges the dampener 50 toward the unflexed configuration when the spray nozzle 12 is pressed against the dampener 50.

The dampener 50 may be specifically configured to apply a particular biasing/resistive force on the spray nozzle 12 as the user depresses the spray nozzle 12. For instance, the dampener 50 may be configured to apply a uniform force on the spray nozzle 12, or alternatively, a variable force on the spray nozzle 12. For instance, the dampener 50 may apply a small force on the spray nozzle 12 as the user initially depresses the spray nozzle 12 to allow the user to "mist" or lightly spray the contents of the can onto the intended area. As the user presses harder on the spray nozzle 12 to increase the pressure of the fluid emission, the dampener 50 may apply an increased counteracting force on the spray nozzle 12.

Figure 9A:
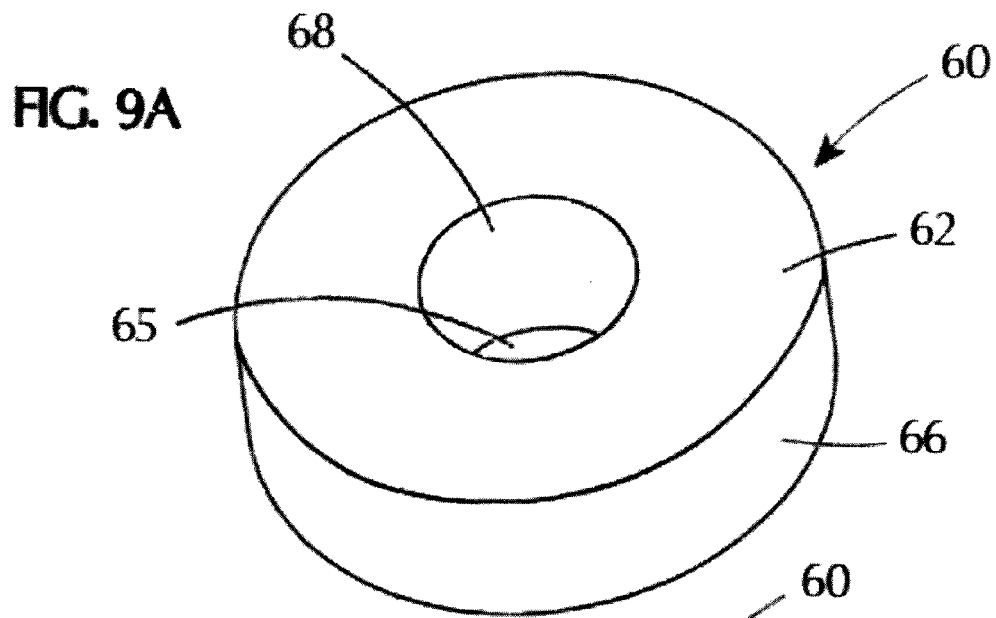
FIGS. 9A-9C are various views of an embodiment of the dampener.
Figure 9B:
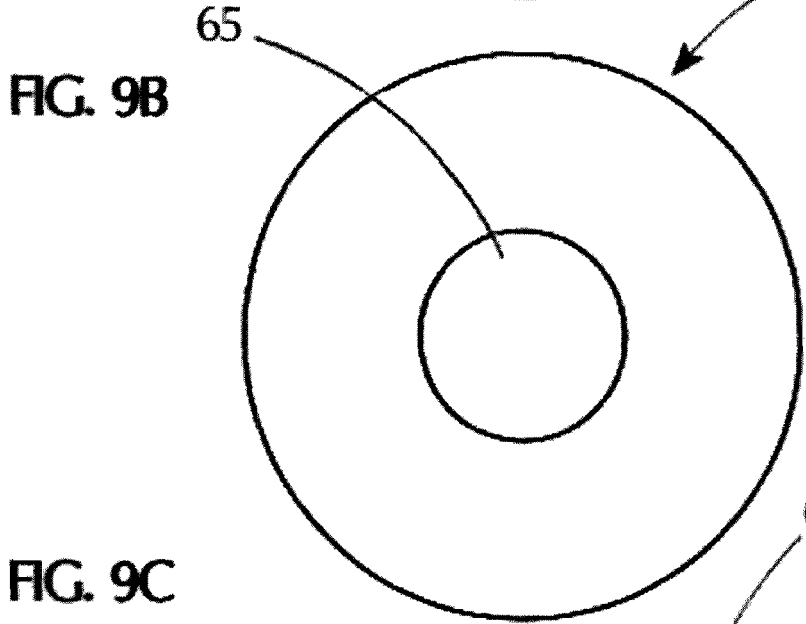
Figure 9C:
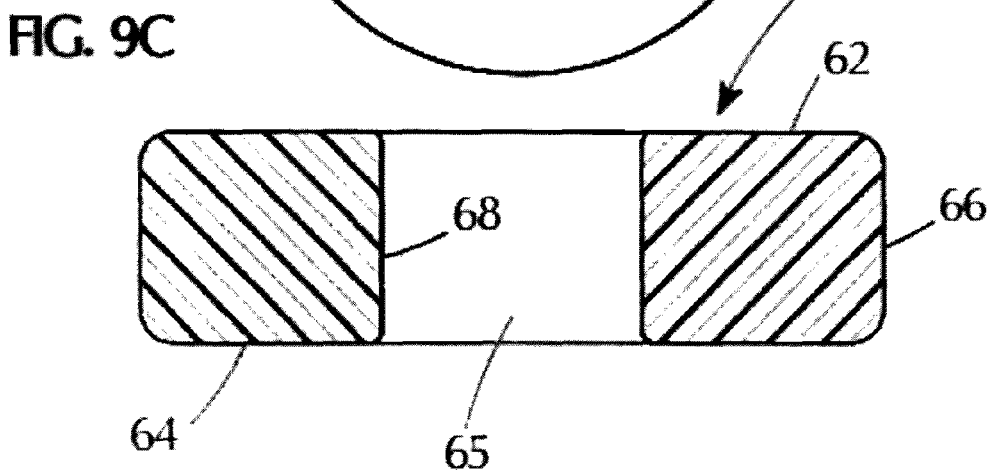

Referring now to FIGS. 9A-9C, there is shown one embodiment of a dampener 60 including a generally planar upper surface 62, a generally planar lower surface 64, a cylindrical outer surface 66 and a cylindrical inner surface 68 defining an inner opening 65.

Figure 9D:
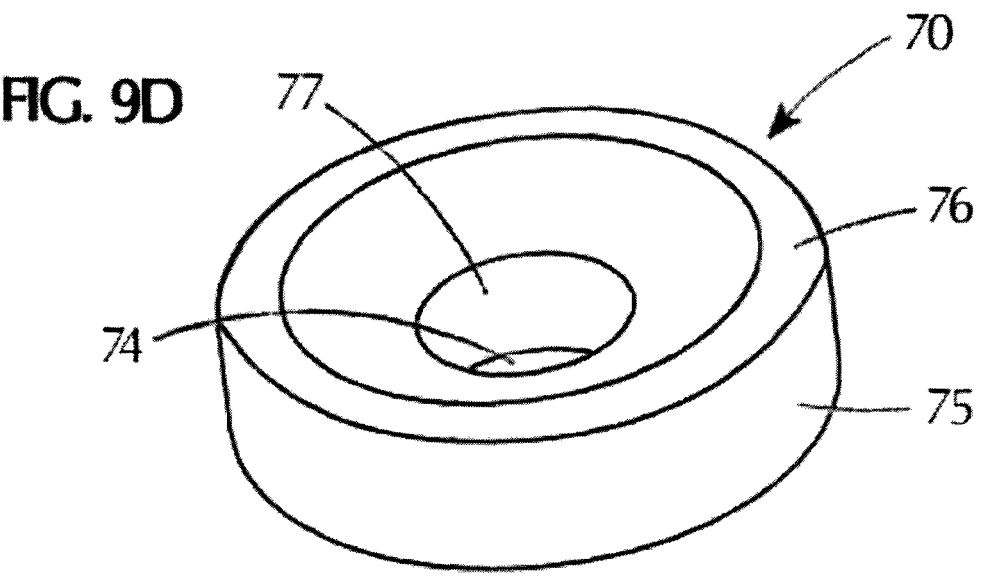
FIGS. 9D-F are various views of another embodiment of the dampener.
Figure 9E:
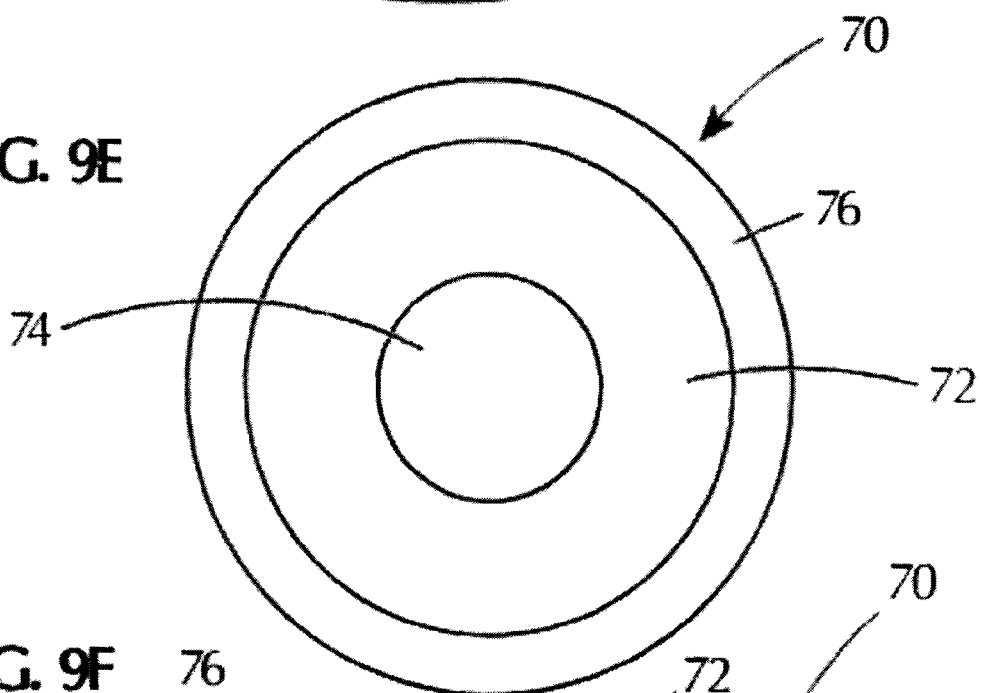
Figure 9F:
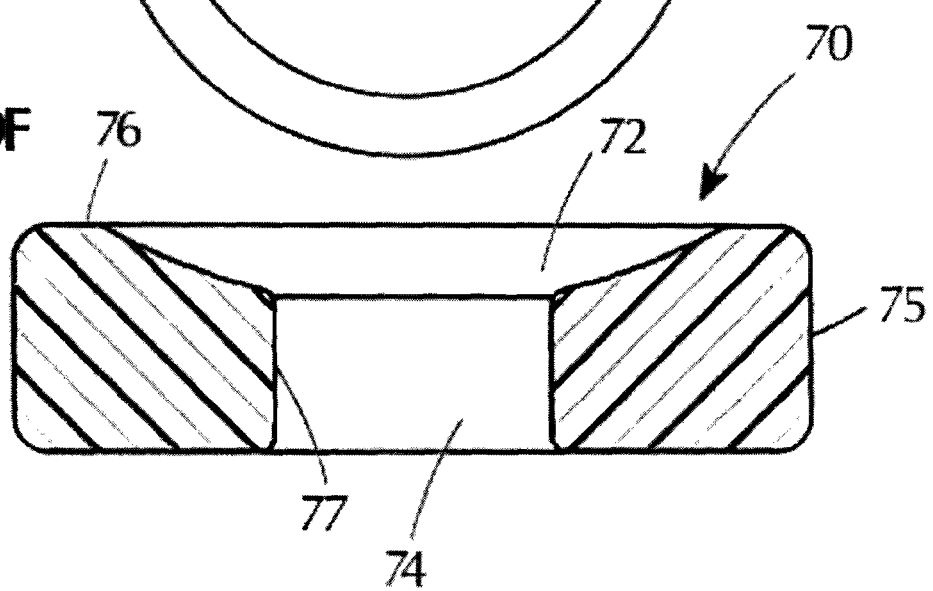

FIGS. 9D-9F depict another embodiment of the dampener 70 which differs from the dampener 60 shown in FIGS. 9A-9C in that the dampener 70 include a concave upper surface 72. The concave upper surface 72 extends from the central opening 74 in a radial direction to a planar upper rim 76. Thus, the thickness of the dampener 70 increases from the opening 74 to the upper rim 76. The dampener 70 additionally includes a cylindrical outer surface 75, a cylindrical inner surface 77 and a lower surface 78.

The dampener 70 operates in substantially the same manner as the dampener 60 described above, except that the concave upper surface 72 applies a slightly different dampening force on the spray nozzle 12 as the dampener 70 is moved from the unflexed configuration toward the flexed configuration.

Figure 9G:
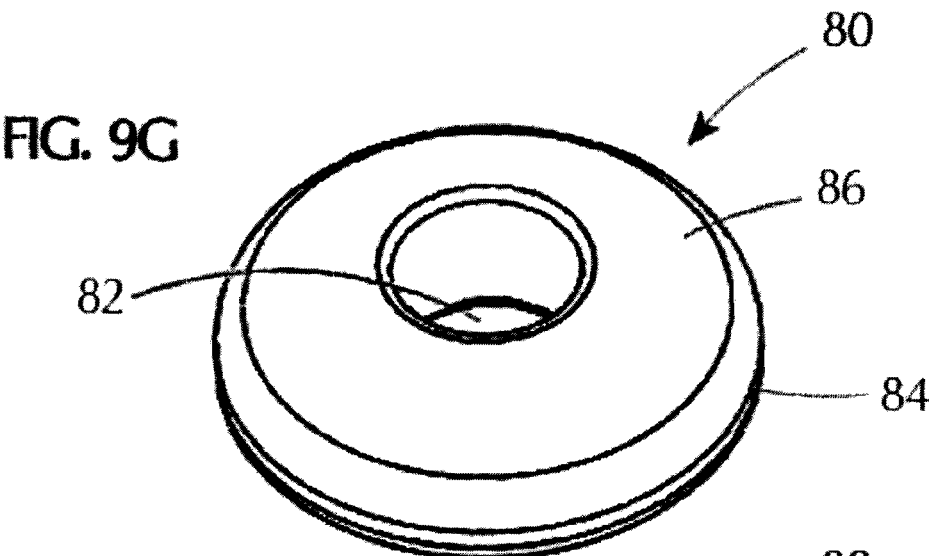
FIGS. 9G-I are various views of a further embodiment of the dampener.
Figure 9H:
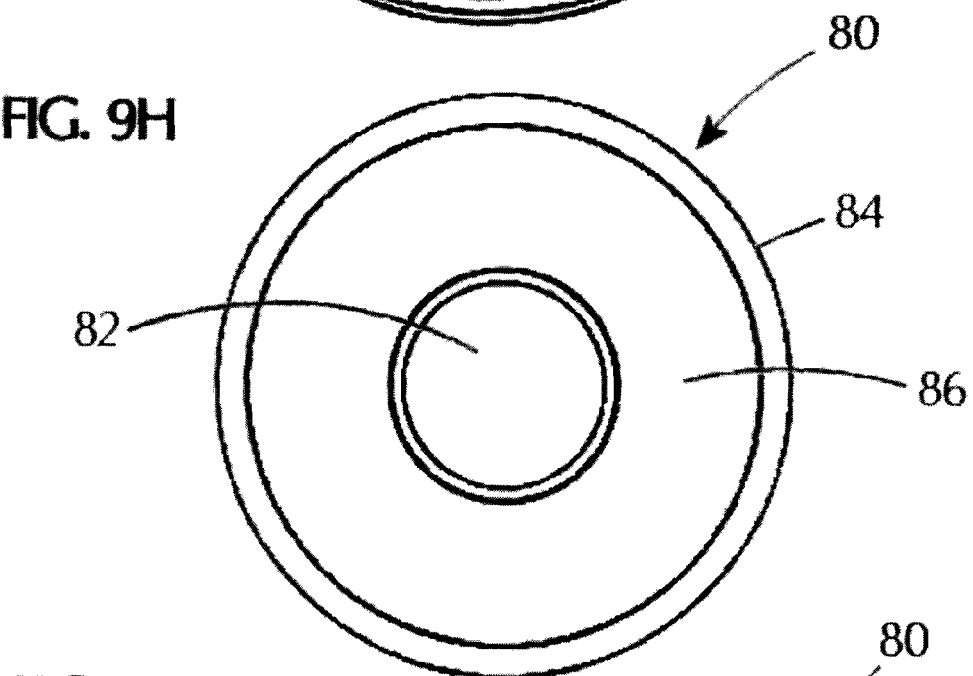
Figure 9I:
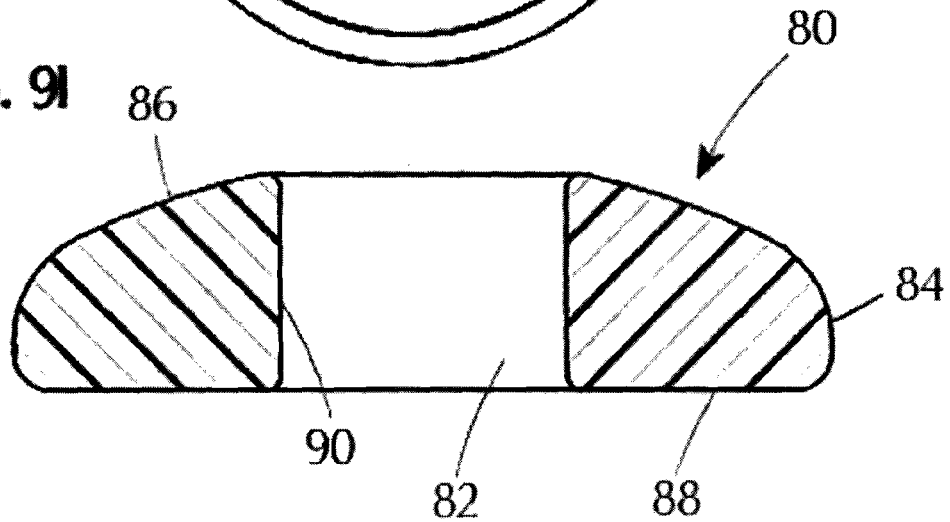

FIGS. 9G-9F show yet another embodiment of a dampener 80 which include a cross sectional thickness which generally decreases from a central opening 82 to a peripheral edge 84. In this regard, the upper surface 86 is angled downwardly in a radially outward direction. The dampener 80 also includes a lower surface 88 and an inner cylindrical surface 90.

The dampener 80 operates in substantially the same manner as the dampeners 60, 70 described above, except that the unique cross sectional configuration of the dampener 80 applies a unique dampening force on the spray nozzle 12 as the spray nozzle 12 is pressed by the user. Along these lines, those skilled in the art will readily appreciate that the particular embodiments of the dampeners 50, 60, 70, 80 are exemplary in nature only and that the dampener may define other shapes and configurations without departing from the spirit and scope of the present invention. Furthermore, there is an association between the cross sectional shape of the dampener and the dampening force the dampener will apply to the spray nozzle. Thus, by modifying the shape of the dampener, the dampening force may be altered.

Referring now to FIGS. 10A-10J, there is shown several different embodiments of extension tubes which may be used in connection with the adapter body. Each extension tube defines a first end portion and an opposing second end portion and a middle portion extending between the first and second end portions. The extension tube may define several different configurations to facilitate disbursement of the pressurized fluid to hard to reach areas, such as around corners and in tight spaces. For instance, the extension tube may have a generally 90° bend, as is shown in FIG. 10A, or may be substantially linear. Furthermore, the extension tube may have two generally 90° bends, as is shown in FIGS. 10C and 10E. FIG. 10B shows an extension tube having a bend which is each less than 90°. It is additionally contemplated that the length of the extension tube may be altered without departing from the spirit and scope of the present invention.

It is contemplated that the extension tubes may be selectively inserted within the inner channel of the adapter body to connect the extension tube to the adapter body and the spray nozzle. Several different extension tubes may be sold as a kit, and may be selectively interchanged as needed.

Furthermore, it is also contemplated that the adapter and the extension tube(s) may be packaged as a kit for sale. The kit may include one or more configurations of the adapter (such as those shown in FIGS. 4A-4C) as well as one or more configurations of the extension tube (such as those shown in FIGS. 10A-10J). It is also contemplated that the kit may include one or more dampeners, as described above The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. An adapter configured for use with an aerosol can spray nozzle and an extension tube to securely and fluidly connect the extension tube to a nozzle orifice formed within the spray nozzle, the spray nozzle being operatively connectable to a valve mechanism of a conventional aerosol can, the adapter comprising:

an adapter body configured to be engageable with the spray nozzle, the adapter body having a first surface, a second surface, and a side surface extending between the first and second surfaces, the adapter body defining:
   a spray nozzle portion having an opening extending from the first surface to the second surface, the opening being sized and configured to allow the spray nozzle to be insertable therein; and
   an extension tube portion having an inner channel extending from the opening to the sidewall, the inner channel being sized and configured to allow the extension tube to be insertable therein to create friction-tight engagement between the extension tube and the adapter body, the inner channel being alignable with the nozzle orifice when the spray nozzle is inserted within the opening.

2. The adapter recited in claim 1, wherein the adapter body is formed from a rubber material.

3. The adapter recited in claim 1, wherein the adapter body is formed from a resilient material.

4. The adapter recited in claim 1, wherein the adapter body is configured to enable expansion of the opening in response to the circumferential engagement between the spray nozzle and the adapter body when the spray nozzle is inserted into the opening.

5. The adapter recited in claim 1, wherein the inner channel is configured to allow the extension tube to be inserted therein by a first force and to allow the extension tube to be removed by a second force equal to or greater than the first force.

6. The adapter recited in claim 1, wherein the adapter body includes a plurality of projections extending into the inner channel to facilitate the friction-tight engagement between the adapter body and the extension tube.

7. The adapter recited in claim 1, wherein the adapter body includes a plurality of annular protrusions extending into the inner channel to facilitate the friction-tight engagement between the adapter body and the extension tube.

8. The adapter recited in claim 1, wherein the adapter body includes a helical protrusion extending into the inner channel to facilitate friction-tight engagement between the adapter body and the extension tube.

9. The adapter recited in claim 1, therein the adapter body includes an open slot formed within the spray nozzle portion and extending in a first direction from the opening to the side surface and in a second direction from the first surface to the second surface, the open slot allowing the size of the opening to increase when the nozzle is inserted into the opening.

10. The adapter recited in claim 1, wherein the adapter body is formed from a metallic material.

11. The adapter recited in claim 1, wherein the spray nozzle portion is sized and configured to circumferentially engage the spray nozzle when the spray nozzle is inserted within the opening.

12. An adapter configured to securely and fluidly connect an aerosol can spray nozzle having a nozzle orifice to an extension tube, the spray nozzle being operatively connectable to a valve mechanism of a conventional aerosol can, the adapter comprising:

an adapter body having:
   an engagement surface defining an opening sized to receive the nozzle, the engagement surface being circumferentially engageable with the nozzle; and
   an inner channel extending from the opening to an external surface of the adapter body, the inner channel being alignable with the nozzle orifice when the nozzle is received within the opening and configured to facilitate friction-tight engagement with the extension tube.

13. The adapter recited in claim 12, wherein the adapter body is formed from a resilient material.

14. The adapter recited in claim 12, wherein the adapter body is configured to expand to increase the size of the opening when the nozzle is inserted into the opening.

15. The adapter recited in claim 12, wherein the inner channel is configured to allow the extension tube to be inserted therein by a first force and to allow the extension tube to be removed by a second force equal to or greater than the first force.

16. The adapter recited in claim 12, wherein the adapter body includes a plurality of projections extending into the inner channel to facilitate the friction-tight engagement between the adapter body and the extension tube.

17. The adapter recited in claim 12, wherein the adapter body includes a plurality of annular protrusions extending into the inner channel to facilitate the friction-tight engagement between the adapter body and the extension tube.

18. The adapter recited in claim 12, wherein the adapter body includes a helical protrusion extending into the inner channel to facilitate friction-tight engagement between the adapter body and the extension tube.

19. The adapter recited in claim 12, therein the adapter body includes a open slot formed within the spray nozzle portion and extending in a first direction from the opening to the side surface and in a second direction from the first surface to the second surface, the open slot allowing the size of the opening to increase when the nozzle is inserted into the opening.

20. An adapter kit configured for use with an aerosol can having a spray nozzle including a nozzle orifice, the spray nozzle being operatively connectable to a valve mechanism of the aerosol can, the adapter kit comprising:

an extension tube; and an adapter body having a first surface, a second surface, and a side surface extending between the first and second surfaces, the adapter body defining:

a spray nozzle portion having an opening extending from the first surface to the second surface, the opening being sized and configured to allow the spray nozzle to be insertable therein to allow the spray nozzle portion to circumferentially engage the spray nozzle; and an extension tube portion having an inner channel extending from the opening to the sidewall, the inner channel being sized and configured to allow the extension tube to be insertable therein to facilitate friction-tight engagement between the extension tube and the adapter body, the inner channel being alignable with the nozzle orifice when the spray nozzle is inserted within the opening.

\* \* \* \* \*